United States Patent [19]

Brown et al.

[11] 4,004,636
[45] Jan. 25, 1977

[54] COMBINED MULTIPLE SOLVENT AND THERMAL HEAVY OIL RECOVERY

[75] Inventors: Alfred Brown; Ching H. Wu; Daniel T. Konopnicki, all of Houston, Tex.

[73] Assignee: Texaco Inc., New York, N.Y.

[22] Filed: May 27, 1975

[21] Appl. No.: 580,863

[52] U.S. Cl. .............................. 166/272; 166/273; 166/303
[51] Int. Cl.² ..................... E21B 43/22; E21B 43/24
[58] Field of Search .......... 166/269, 272, 273, 274, 166/303, 305 R

[56] References Cited
UNITED STATES PATENTS

| | | | |
|---|---|---|---|
| 2,718,262 | 9/1955 | Binder, Jr. | 166/274 |
| 2,822,872 | 2/1958 | Rzaja et al. | 166/273 |
| 2,880,801 | 4/1959 | Crump | 166/274 |
| 3,147,803 | 9/1964 | Reed et al. | 166/273 |
| 3,231,018 | 1/1966 | Handy | 166/274 |
| 3,354,958 | 11/1967 | Parker | 166/303 |
| 3,439,743 | 4/1969 | Wyllie | 166/273 |
| 3,608,638 | 9/1971 | Terwilliger | 166/272 |
| 3,954,141 | 5/1976 | Allen et al. | 166/274 |

*Primary Examiner*—Stephen J. Novosad
*Assistant Examiner*—George A. Suchfield
*Attorney, Agent, or Firm*—T. H. Whaley; C. G. Ries; Jack H. Park

[57] ABSTRACT

Petroleum may be recovered from viscous petroleum-containing formations including tar sand deposits by a process involving injecting into the formation a multiple-component solvent for the petroleum and a thermal fluid. At least one solvent component is gaseous at the temperature and pressure of the petroleum reservoir such as carbon dioxide, methane, ethane, propane, butane or pentane, and at least one component is liquid at the reservoir conditions, such as hexane and higher molecular weight aliphatic hydrocarbons or aromatic hydrocarbons such as benzene. The multiple solvent injection is continued with no production until the pressure is from 50 to 250% above the vapor pressure of the solvent, at which pressure the solvent mixture is substantially all in the liquid phase. Recovery of petroleum and solvent is from a remotely located well by reducing the pressure in the portion of the formation contacted by the solvents to a value from 5 to 100% above the vapor pressure of the gaseous solvent. A fluid heated to a temperature above the boiling point of the solvent, such as steam, is then injected into the same well as was used for solvent injection. The heated fluid raises the temperaure of the solvent on contact therewith, causing vaporization of the gaseous component, which gaseous solvent expands to force viscous petroleum with liquid solvent dissolved therein toward the production well. In formations having oil saturation greater than 50%, this oil saturation should first be reduced to a value below 50% to prevent plugging.

26 Claims, No Drawings

COMBINED MULTIPLE SOLVENT AND THERMAL HEAVY OIL RECOVERY

CROSS REFERENCE TO RELATED APPLICATIONS

This application is related to copending application Ser. No. 546,580 filed Feb. 3, 1975.

BACKGROUND OF THE INVENTION

1. Field of the Invention

This invention is concerned with a method for recovery of petroleum from viscous petroleum-containing formations including tar sand deposits, and more particularly is concerned with an improved multiple-component solvent and thermal flooding technique especially useful in viscous petroleum-containing formations including tar sand deposits.

2. Description of the Prior Art

There are many subterranean petroleum-containing formations in various parts of the world from which petroleum cannot be recovered by conventional means because the petroleum is too viscous to flow or be pumped. The most extreme example of viscous petroleum-containing formations are the so-called tar sand or bituminous sand deposits. The largest and most famous such formation is the Athabasca Tar Sand Deposit in the northeaster part of the Province of Alberta, Canada, which contains over 700 billion barrels of petroleum. Other extensive deposits are known to exist in the western United States and Venezuela, and smaller deposits exist in Europe and Asia.

Tar sands are defined as sand saturated with a highly viscous crude petroleum material not recoverable in its natural state through a well by ordinary production methods. The petroleum constituent of tar sand deposits are highly bituminous in character. The sand present in tar sand deposits is generally fine quartz sand coated with a layer of water, with the bituminous petroleum material occupying most of the void space around the water wetted sand grains. The balance of the void space is filled with connate water, and some deposits contain small volumes of gas such as air or methane. The sand grains are packed to a void volume of about 35 percent, which corresponds to 83 percent by weight sand. The balance of the material is bitumen and water, and the sum of bitumen and water is fairly consistantly 17 percent by weight, with the bitumen portion thereof varying from about 2 percent to about 16 percent. One of the characteristics of tar sand deposits which differs considerably from conventional petroleum-containing formations is the absence of a consolidated mineral matrix within the formation. The sand grains are at least partially in contact although generally uncemented. The API gravity of the bitumen ranges from about 6 to about 8, and the specific gravity at 60° F is from about 1.006 to about 1.027. The viscosity of bituminous petroleum is in the range of 1,000,000 centistokes at 40° F, which is so viscous that some on-site refining of the produced bituminous petroleum must be undertaken if the material is to be pumped in an unheated pipeline.

The methods for recovering bituminous petroleum from tar sand deposits include strip mining and in situ separation processes. Most of the recovery to date has been by means of strip mining, although this is economically feasible only when the ratio of overburden thickness to tar sand deposit thickness is around 1 or less. Vast quantities of petroleum are known to exist in the form of tar sand deposits which are not within a range which is economically suitable for strip mining, and so there is a serious need for some form of in situ process wherein the bitumen or bituminous petroleum is separated from the sand by some means and recovered therefrom through a well or other production means drilled into the tar sand deposit.

In situ processes proposed in the literature may be categorized as thermal techniques, including fire flooding or in situ combustion and steam flooding, and emulsification drive processes. To be successful, an in situ separation process must accomplish two functions: the viscosity of the crude oil must be reduced and sufficient driving energy to induce movement of the crude oil must be supplied.

Another possible process for recovering viscous petroleum such as bitumen from tar sand deposits is solvent flooding, which involves injection of a suitable solvent for the viscous petroleum into the formation, which solvent dilutes and reduces the viscosity of the viscous petroleum to render it mobile and recoverable by means of a well as is normally employed in conventional oil recovery operations. Although many solvents including aromatic hydrocarbons such as benzene, toluene and xylene, as well as carbon tetrachloride or carbon disulfide, readily dissolve bituminous petroleum, these materials are expensive and since large quantities are required, solvent flooding has not been considered to be economically feasible. Paraffinic hydrocarbons such as propane, butane, pentane, etc. are more readily available and less expensive than those solvents described above, but it has always been uniformly assumed by persons skilled in the art that paraffinic hydrocarbon solvents could not be used in bituminous petroleum because of the danger of precipitating asphaltenes. Indeed, the asphaltic constituents of crude oil are frequently defined as pentane-insoluble materials.

It can be seen from the foregoing that there is a substantial need for a method for recovering viscous petroleum such as bitumen or bituminous petroleum from a tar sand formation by use of readily available inexpensive solvents in a relatively low pressure procedure that can be used in intermediate deep deposits as well as in deep deposits.

SUMMARY OF THE INVENTION

We have discovered, and this constitutes our invention, that viscous petroleum including bitumen may be recovered from viscous petroleum-containing formations including tar sand deposits by injecting into the formation a mixture of hydrocarbon solvents. At least one component of the solvent mixture must be liquid at formation temperatures and pressures and at least one component must be gaseous at formation temperatures and pressures, and the mixture must be liquefiable at formation temperatures and injection pressures well below the overburden fracture pressure. Hereinafter these solvents will be referred to as gaseous solvents and liquid solvents, although it is to be understood that these terms refer to the phase of the solvent at formation temperature and pressure and not at normal conditions. Suitable materials for the gaseous solvents include methane, ethane, propane, butane and pentane, as well as ethylene, propylene and butylene, and carbon dioxide. Suitable liquid hydrocarbon solvents are hexane, heptane and higher molecular weight aliphatic hydrocarbons as well as aromatic hydrocarbons such as benzene or toluene. For example, a mixture of propane and hexane is a very desirable combination for recovering viscous petroleum such as bitumen from a subsurface tar sand deposit. A mixture of crude propane and natural gasoline comprises another preferred combination. Production of viscous petroleum or bitumen occurs when the temperature in a portion of the reservoir contacted by the liquefied solvent mixture is increased to a value above the boiling point of the mixture at a pressure above the vapor pressure at formation temperature, causing the gaseous solvent to break out of solution and displace a solution of liquid solvent and crude oil in a fashion similar to solution gas drive.

The preferred method of applying the process of our invention involved (1) injecting the solvent mixture until the pressure in the part of the formation adjacent the injection well is from 50 to 250 percent above the vapor pressure of the mixture at formation pressure followed by (2) production of petroleum and solvent from the formation under controlled conditions, carefully maintaining the pressure in the formation above the vapor pressure of the solvent mixture, (3) terminating production of petroleum when the pressure has been reduced to a value from 5 to 100% and preferably from 10 to 50% above the vapor pressure of the solvent mixture, (4) injecting a hot fluid such as steam, said fluid having a temperature at least 25° F and preferably 50° F greater than the vaporization temperature of the solvent mixture, which causes vaporization of the gaseous solvent at the point where the heated fluid raises the temperature of the solvent mixture above the boiling point of the solvent mixture, and (5) taking production of petroleum and liquid solvent from a remotely located well. Surprisingly, the use of paraffinic hydrocarbons such as hexane, etc. in application of this process to tar sand materials does not appear to cause precipitation of asphaltic materials.

DESCRIPTION OF THE PREFERRED EMBODIMENTS

I. The Process

The first step of our process comprises a non-aqueous fluid injection operation necessitating at least two wells drilled into and in fluid communication with the viscous petroleum formation. An effective solvent mixture for the particular viscous petroleum or bitumen to which the process is to be applied, is injected via the injection well. The solvent mixture contains at least one gaseous component and at least one liquid component.

By "gaseous," we mean, for the purpose of this application, a solvent which is gaseous at the pressure and temperature existing in the formation. Similarly, by the term "liquid solvent" we mean a solvent which is liquid at formation pressure and temperature.

The mixture of the liquid and gaseous hydrocarbon solvent is injected into the formation at a pressure from 50 to 250 percent above the bubble point of the mixture, so that substantially all of the solvent mixture is in the liquid phase at least by the conclusion of solvent injection. It is desirable that the solvent mixture exist in the formation as a liquid before the next step is initiated.

The liquid and gaseous solvents may be mixed on the surface and introduced via one injection string, or two or more injection strings may be used so the liquid and gaseous solvents are injected independently to mix in the formation. Alternatively, separate slugs of the materials may similarly be injected sequentially to mix in the formation. The generally preferred method, however, is to mix the components on the surface and introduce the single liquid phase mixture into the formation by means of a single injection string. The mole ratio of gaseous solvent to liquid solvent may be from 0.10 to 10 and is preferably from .2 to 2.0.

The solvents or solvent mixture are injected into the formation at a pressure which ultimately will be from 50 to 250 percent above the vapor pressure of the solvent mixture at formation pressure, so the solvent mixture will ultimately be all in the liquid phase in the formation. Of course, if the liquefication pressure is substantially above the formation pressure, the injection pressure will initially be well below the target pressure, and some gas phase may exist in the early phase of solvent injection. It is preferable that little or no production occurs during the solvent injection phase to aid in reaching the desired pressure quickly.

The next phase of our process involved production of some formation fluid including petroleum as well as solvent. Production in this phase may be from the same well as was used for injecting solvent or from a remotely located well or from both wells. If the oil saturation is less than 50%, the production rate should be throttled so as to avoid reducing the pressure in any substantial part of the formation being treated to a value below the vapor pressure of the solvent at formation temperature. The formation pressure is not allowed to go below a value from about 5 to 100% and preferably from 10 to 50% above the vapor pressure of the solvent. This results in recovery of some viscous petroleum which is necessary to improve steam or other hot fluid injection without occurrence of plugging and yet avoids the formation of pockets of free gas in the formation of which can cause poor displacement efficiency in subsequent recovery operations.

In formations having an oil saturation of 50% (based on formation pore volume) or greater, we have found that an additional preliminary step is required to reduce the oil saturation to a value less than 50%. This process may involve injecting the same liquid-gaseous solvent mixture as is described above and elsewhere herein into one or more wells, until the pressure in the formation is substantially above the vapor pressure of the solvent mixture followed by production from at least one and preferably from several or all of the wells, depleting to a formation pressure substantially below the vapor pressure of the solvent to cause vaporization of the gaseous component, which displaces petroleum and liquid solvent to one or preferably several of the wells. Several cycles of the foregoing process may be required to bring the oil saturation to a value below 50%. We have found that this additional pretreatment phase is required to prevent plugging in the formation upon subsequent injection of a hot fluid such as steam. Once the oil saturation is reduced to a value below 50%, the process of solvent injection followed by production from the producing well to a value above the vapor pressure of the solvent mixture followed by steam injection may be applied without danger of plugging. After the above described controlled production phase has been completed, a heated fluid, steam or a mixture of steam and a noncondensible gas such as nitrogen, air or a gaseous hydrocarbon such as methane or ethane, or a mixture of steam and a solvent such as pentane is injected into the formation. This phase is preferably a multi-well, throughout operation in which the heated fluid is injected into one well, preferably the same well as was used for solvent injection, and production of viscous petroleum plus is taken from a remotely located well. The heated fluid should be at a temperature substantially above the temperature which will cause vaporization of the gaseous solvent component of the solvent mixture, preferably at least 50° F greater than the boiling temperature. The increase in temperature in the portion of the formation contacted by solvent causes vaporization of the gaseous solvent, which results in a large volume expansion. This volume expansion generates the drive force for oil recovery, driving the petroleum toward the production well. At least a portion of the liquid solvent remains liquid, dissolved in the petroleum, providing the necessary viscosity reduction for production of high viscosity petroleum. Solvent recovery and recycling will normally be desirable in order to reduce the total inventory of solvent required. The gaseous solvent can be removed from the produced petroleum-solvent solution by reducing the pressure. Much of the gas will have broken out of solution in the production phase, and it is only necessary to provide a closed system to capture this gase for reuse. A compressor will ordinarily be needed to raise the pressure of the gaseous solvent in order to condense this material into a liquid for reinjection into the formation.

Separation of the liquid hydrocarbon solvent may be accomplished by thermal distillation such as by a coke still. If the viscous petroleum is to be subjected to some form of cracking in a processing unit located some distance from the production point, all or a portion of the liquid hydrocarbon solvent may be allowed to remain in the viscous crude to facilitate transportation thereof in a pipeline to the cracking unit. This is especially true in the instance of applying this process to tar sands, since bitumen is much too viscous to pump in its natural form.

When a coke still is used for on site processing of bitumen or other very viscous petroleum, substantial amounts of hydrocarbons in the molecular weight range needed for both the gaseous solvent and the liquid solvent are produced. Since the quantity of both types of solvent will increase with time due to the increase in swept volume, it is very advantageous to obtain the desired solvent materials from a coke still.

II. The Liquid Solvent

Any material capable of dissolving the viscous petroleum or bituminous petroleum contained in the formation to which the process to be applied, resulting in the formation of a single (liquid) phase solution of solvent and bitumen having a viscosity substantially less than the viscosity of virgin bitumen, which material is a liquid at formation temperature and pressure, may be used as the liquid solvent in our process.

Aliphatic hydrocarbons, specifically linear or branched paraffinic hydrocarbons having from 6 to 12 carbon atoms are suitable materials for use as the normally liquid solvent for practicing the process of our invention. For example, hexane, heptane, nonane, decane, etc. and mixtures thereof as well as commercial blends such as natural gasoline and naphtha will function as a satisfactory liquid solvent in many viscous petroleum-containing formations.

Mononuclear aromatic hydrocarbons, especially benzene, toluene, xylene, or other substituted benzene materials, as well as multiple ring aromatic compounds such as naphthalene, are excellent liquid solvents for use in our process. Economics will generally dictate that only simpler compounds such as benzene, toluene or xylene, and mixtures thereof, will be used. A mixture of aromatic and aliphatic hydrocarbons is a very satisfactory solvent. Mixed aromatic solvents are frequently available from processing streams of refineries which contain a mixture of benzene, toluene, xylene, and substantial amounts of aliphatic hydrocarbons such as propane or butane. Such materials are economical solvents and frequently the materials are very satisfactory. This can best be determined by simple tests utilizing the solvent under consideration and a sample of crude petroleum from the formation. Mixtures of aromatic hydrocarbons and aliphatic hydrocarbons are excellent liquid solvents for use in our process.

Mixtures of any two or more of the above described compounds may also be used as the normally liquid solvent in the practice of the process of our invention.

III. The Gaseous Solvent

Any solvent which is gaseous at formation temperature and pressure and which can be liquefied at injection conditions may be used as the gaseous solvent in the process of our invention. Low molecular weight aliphatic hydrocarbons including paraffinic hydrocarbons such as methane, ethane, propane, butane or pentane, as well as olefinic hydrocarbons such as ethylene, propylene, or butylene are preferred materials. Carbon dioxide is also a very satisfactory gaseous solvent, alone or mixed with gaseous hydrocarbon solvents. Mixtures of any two or more of these gaseous solvent may also be used.

The concentrations of gaseous solvent and the liquid solvent may vary over a fairly broad range and to some extent the preferred concentrations for any particular application will depend on the viscosity of the in place petroleum and other formation factors. Greater petroleum viscosity reduction is achieved by using larger concentrations of liquid solvent, whereas the greater degree of solution gas drive effect results from using a greater quantity of the gaseous solvent.

IV. Field Example

In order to better understand the process of our invention, the following pilot field example is offered as an illustrative embodiment of our invention; however, it is not meant to be limitative or restrictive thereof.

A tar sand deposit is located at a depth of 150 feet and the thickness of the deposit is 70 feet. Since the ratio of overburden thickness to tar sand deposit thickness is greater than one, the deposit is not economically suitable for strip mining. It is determined that the most attractive method of exploiting this particular reservoir is by means of solvent-thermal flooding according to the present process. The formation temperature is 65° F. The formation porosity is 37 percent and the oil saturation is 60 percent (based on pore volume).

A commercial grade propane is available at an attractive price in the area, the composition of this material being 75% propane, 5% ethane, 3% methane, 4% butane, 2% pentane and 2% carbon dioxide, with the balance being composed of small quantities of ethylene, propylene, and butylene. This material is essentially all gaseous at formation pressure and temperature, so it is quite suitable for use as the gaseous solvent. Natural gasoline, which is principally composed of $C_6 - C_{10}$ hydrocarbons, is also available from a local refinery at an attractive price. A mixture comprising 25 mole percent crude propane and 75 mole percent natural gasoline is used as the injected multi-component solvent. This combination will be liquid at any pressure above about 40 pounds per square inch at 75° F.

Two wells are drilled 50 feet apart, and the area swept by the injected solvent is determined by reservoir modeling to be 2000 square feet. Since the porosity of the formation is 37 percent, and the vertical conformance is 50%, the swept volume will be $(.37) \times (2000) \times (70) \times (.5)$ or 25,900 cubic feet.

A 20 pore volume percent, or 5180 cubic feet slug (38,751 gallons) of the above described mixture is injected into one of the two wells drilled into and completed in the tar sand formation. The injection pressure is raised to 100 pounds per square inch. The criteria for the limit for injection pressure are (1) the ultimate pressure must be sufficiently high to insure that the multi-component solvent combination exist in the formation in the liquid phase, and (2) the pressure must not be so high that lifting or fracturing of the overburden results. As a general rule, overburden fractures can be avoided by maintaining the solvent injection pressure expressed in pounds per square inch below a value numerically equal to the overburden thickness expressed in feet. In this case, the multi-component solvent combination is introduced into the formation at a final pressure of 100 pounds per square inch. The liquid solvent combination exist in the formation as a liquid at the conclusion of the injection phase. Injection of solvent continues until the pressure reaches 100 psig and/or the flow rate at 100 psi injection pressure declines materially. Solvent injection is then terminated and the pressure in each wellbore is reduced to a pressure of 30 psig, causing vaporization of the gaseous solvent. A solution of bitumen and liquid solvent is allowed to flow from the formation into both wellbores and therethrough to the surface of the earth. Reduction in pressure is sufficient to cause the gaseous solvent to vaporize, in the first phase. Presence of the solvents in the bitumen maintains the bitumen in a liquid state with sufficiently low viscosity that it will flow to the wellbore and can be pumped to the surface. When the production rate declines, solvent injection is terminated. Based on the volume of bitumen produced, it is determined that the formation oil saturation is reduced to a value of 53%, so one more cycle of solvent injection followed by depletion to a value below the vapor pressure is required to reach an oil saturation less than 50%. After the completion of this second cycle, the oil saturation is determined to be about 45%.

The solvent mixture is again injected into the formation by both wells until the pressure reaches a value of about 100 pounds per square inch. Injection is then terminated and production is taken at a slow rate from the second well until the formation pressure has been depleted to a value of 60 pounds per square inch, which is well above the vapor pressure of the solvent mixture.

Eighty percent quality steam is then injected into the injection well and the production well is opened slowly to permit production of viscous petroleum. The gaseous solvent begins vaporizing when the solvent mixture temperature exceeds the boiling point of the solvent. The vaporization results in a large volume expansion, which pushes petroleum and liquid solvent toward the production well. The gaseous solvent vaporization occurs only in the portion of the formation where steam raises the solvent temperature above the boiling point. This is remotely located from the production well. Little or no gaseous solvent vaporization occurs in the formation near the production well so long as the pressure in the formation adjacent to the production well is maintained above the vapor pressure of the solvent at the temperature of the formation near the production well, so good displacement efficiency is achieved.

Steam injection is continued until the temperature of at least a major portion of the formation being swept exceeds the vaporization temperature of the gaseous solvent, at which point steam injection is terminated and water is injected to finish displacing petroleum and solvent toward the production well.

Solvent recovery from produced petroleum and recycling is used in all phases of this project in order to reduce the quantity of solvent required.

V. Experimental Section

In order to demonstrate the operability of the process of our invention, and further to determine the recovery efficiency and magnitude of oil recovery resulting from the application thereof, the following laboratory experimental work was performed.

An insulated cell 17.62 cm (7 inches) in length and 9.46 cm$^2$ in cross sectional area was packed with a mined tar sand sample which had been obtained from a strip mining operation in Alberta, Canada. The tar sand material was packed in the cell to a density of 1.89 grams per cubic centimeter. The porosity was determined to be 38.8% and the total pore volume was 65.1 cubic centimeters. The initial oil saturation was 67.4 and the water saturation was 5.3%. Air permeability as 2.57$\mu$m$^2$ (2610 millidarcies). The porosity was 38.8%.

Nitrogen gas was injected through the tar sand pack to establish initial communication.

Four runs were made, wherein the solvents used were (1) propane, (2) butane, and for runs (3) and (4), a mixture comprising 23 mole percent propane and 77 mole percent pentane. Since the experiments were performed at room temperature, and pentane is liquid at the temperatures of the experiment, so pentane was used as the liquid solvent in these runs.

The data contained in Table I below give the solvent, injection and depletion pressures, and results in runs 1–4.

TABLE I

| Run No. | Solvent Slug Used | Solvent Slug Size %Pore Vol. | Solvent Injection Pressure kPa (psia) | Pressure to Which Cell was depleted kPa (psia) | Solvent Vapor Pressure at 24.2° C kPa (psia) | Results Oil Recovery % of Oil Originally Present | Residual Oil Saturation or Plugged |
|---|---|---|---|---|---|---|---|
| 1 | Propane | 30 | 1480(215) | 861(125) | 910(132) | 61 | 25% |
| 2 | Butane | 30 | 1138(165) | 241(35) | 348(36) | Plugged | — |
| 3 | Propane plus Pentane | 32 | 1480(215) | 241(35) | 326(39) | Plugged | — |
| 4 | Propane plus | | | | | | |

TABLE I-continued

| Run No. | Solvent Slug Used | Solvent Slug Size %Pore Vol. | Solvent Injection Pressure kPa (psia) | Pressure to Which Cell was depleted kPa (psia) | Solvent Vapor Pressure at 24.2° C kPa (psia) | Results Oil Recovery % of Oil Originally Present | Residual Oil Saturation or Plugged |
|---|---|---|---|---|---|---|---|
| | Pentane | 32 | 1480(215) | 365(53) | 326(39) | 74 | 17.4 |

It can be seen that Run 1, involving propane only as a solvent and depletion to a pressure five percent below the vapor pressure, succeeded in recovering only 61% of the oil originally in place. Run 2, using butane as the solvent with depletion to a pressure 30.7% below the vapor pressure of butane at cell temperature before steam injection, resulted in plugging in the cell.

Runs 3 and 4 were essentially identical, both using a mixture of a gaseous solvent and a liquid solvent, except that in run 3, depletion was to a pressure 26% below the solvent vapor pressure before steam injection, whereas in run 4, depletion was to a value 11.9% above the vapor pressure of the mixture before steam injection. The difference in results were very surprising; run 3 plugged early in the steam flood stage whereas run 4, wherein the pressure was not allowed to drop below the vapor pressure, resulted in recovering 74% of the bitumen originally present and no plugging was observed.

Thus we have disclosed and demonstrated that viscous petroleum can be recovered from a subterranean formation using a solvent combination comprising at least one solvent which is liquid at formation temperature and pressure and at least one solvent material which is gaseous at formation temperature and pressure, when the solvent mixture is injected under liquefication conditions, followed by oil recovery under conditions which avoid vaporization of the gaseous solvent, followed by steam injection. While our invention has been described in terms of a number of illustrative embodiments, it is not so limited since many variations thereof will be apparent to persons skilled in the related art without departing from the true spirit and scope of our invention. Also, whereas mechanisms have been given to explain the results and benefits of our invention, we do not wish to be limited to any particular mechanism or theory of operation of our process. It is our desire and intention that our invention be restricted and limited only by those restrictions and limitations contained in the appended claims.

We claim:

1. A method for recovering viscous petroleum including bitumen from a subterranean, viscous petroleum-containing, permeable formation including a tar sand deposit, the formation having a petroleum saturation below 50%, the formation being penetrated by at least two wells in fluid communication therewith, comprising:
    a. introducing a solvent which is gaseous at formation temperature and pressure, into the formation via the first well until the pressure in the formation exceeds the vapor pressure of gaseous solvent at formation temperature so said gaseous solvent exist essentially all in the liquid phase in the formation;
    b. introducing a solvent which is liquid at formation temperature and pressure, into the formation via the first well;
    c. thereafter reducing the pressure in at least a portion of the petroleum formation contacted by the solvents to a value greater than the vapor pressure of the solvent mixture;
    d. recovering a solution of the petroleum and solvent from the formation via at least one of said wells, maintaining the formation pressure greater than the vapor pressure of the solvent mixture; and finally
    e. injecting a fluid heated to a temperature substantially greater than the boiling temperature of the gaseous solvent into the formation via the first well while recovering petroleum and solvent from said second well.

2. A method as recited in claim 1 wherein the gaseous solvent and liquid solvent are mixed on the surface and injected into the formation as a liquid mixture.

3. A method as recited in claim 1 wherein the gaseous solvent and liquid solvent are injected simultaneously into the formation via separate flow paths, so the solvents mix in the petroleum formation.

4. A method as recited in claim 1 wherein the gaseous solvent and liquid solvent are injected sequentially to mix in the formation.

5. A method as recited in claim 1 wherein the gaseous solvent is selected from the group consisting of aliphatic hydrocarbons having from one to five carbon atoms, carbon dioxide and mixtures thereof.

6. A method as recited in claim 5 wherein the gaseous hydrocarbon solvent is predominantly propane.

7. A method as recited in claim 1 wherein the liquid solvent is selected from the group consisting of aliphatic hydrocarbons having at least six carbon atoms, mononuclear aromatic hydrocarbons, naphtha, natural gasoline, and mixtures thereof.

8. A method as recited in claim 7 wherein the liquid hydrocarbon is hexane.

9. A method as recited in claim 7 wherein the liquid hydrocarbon is natural gasoline.

10. A method as recited in claim 1 wherein the mole ratio of the gaseous solvent to the liquid solvent is from about 0.10 to about 10.

11. A method as recited in claim 1 wherein the maximum pressure at which said solvents are injected into the formation is from about 50 to about 250 percent greater than the vapor pressure of a mixture of said solvents.

12. A method as recited in claim 1 wherein the maximum pressure to which the formation pressure is reduced in step (c) is from about 5 to 100% greater than the vapor pressure of a mixture of said gaseous and liquid solvents.

13. A method as recited in claim 1 wherein the maximum pressure to which the formation pressure is reduced in step (c) is from 10 to 50% greater than the vapor pressure of a mixture of said gaseous and liquid solvents.

14. A method as recited in claim 1 wherein the temperature of said heated fluid injected in step (e) is at least 25% greater than the vaporization temperature of said gaseous solvent.

15. A method as recited in claim 1 wherein the temperature of said heated fluid injected in step (e) is at least 50° F greater than the vaporization temperature of said gaseous solvent.

16. A method as recited in claim 1 wherein said heated fluid injected into well (1) in step (e) is selected from the group consisting of steam and mixtures of steam with inert gases or solvents.

17. A method as recited in claim 16 wherein said heated fluid is a mixture of steam and an inert gas selected from the group consisting of air, nitrogen, carbon dioxide, and mixtures thereof.

18. A method as recited in claim 16 wherein said heated fluid is a mixture of steam and a hydrocarbon solvent selected from the group consisting of methane, ethane, propane, butane and mixtures thereof.

19. A method as recited in claim 1 wherein said heated fluid is steam.

20. A method as recited in claim 1 comprising the additional step of injecting a drive fluid including water into the formation after completion of the heated fluid injection process of step (e).

21. A method of recovering viscous petroleum from a subterranean, viscous petroleum containing permeable formation including a tar sand deposit, the petroleum saturation of the formation being at least 50% based on the formation pore volume, the formation being penetrated by at least two wells in fluid communication therewith, comprising:
 a. contacting the formation petroleum with a solvent having at least one component which is gaseous at formation temperature and pressure and at least one component which is liquid at formation temperature and pressure, said solvent being present in the formation at a pressure greater than its vapor pressure;
 b. reducing the pressure adjacent at least one of the wells to a value below the vapor pressure of said solvent to cause vaporization of at least a portion of said gaseous solvent component;
 c. recovering petroleum from the formation;
 d. repeating the above steps until the petroleum saturation is reduced to a value below 50%,
 e. introducing a solvent having at least one component which is gaseous at formation temperature and pressure and at least one component which is liquid at formation temperature and pressure into the formation via at least one of said wells until the pressure adjacent the well is from about 50 to 250 percent greater than the vapor pressure of said solvent;
 f. reducing the pressure adjacent at least one of said wells to a value from about 5 to about 100 percent greater than the vapor pressure of said solvent;
 g. recovering petroleum and liquid solvent from at least one of said wells; and then
 h. injecting a fluid heated to a temperature at least 25° F greater than the boiling temperature of said solvent at the pressure existing in the formation, into one of the wells, thereby causing vaporization of the gaseous solvent; and
 i. recovering petroleum from another of said wells.

22. A method as recited in claim 21 wherein the liquid solvent component of step (a) is selected from the group consisting of aliphatic hydrocarbons having at least six carbon atoms, mononuclear aromatic hydrocarbons, naphtha, natural gasoline, and mixtures thereof.

23. A method as recited in claim 21 wherein the liquid solvent compartment of step (e) is selected from the group consisting of aliphatic hydrocarbons having at least six carbon atoms, mononuclear aromatic hydrocarbons, naptha, natural gasoline, and mixtures thereof.

24. A method as recited in claim 21 wherein the gaseous solvent component of step (a) is selected from the group consisting of aliphatic hydrocarbons having from one to five carbon atoms, carbon dioxide and mixtures thereof.

25. A method as recited in claim 21 wherein the gaseous solvent component of step (e) is selected from the group consisting of aliphatic hydrocarbons having from one to five carbon atoms, carbon dioxide and mixtures thereof.

26. A method as recited in claim 21 wherein the fluid of step (h) is selected from the group consisting of steam, hot water and mixtures of steam and an inert gas selected from the group consisting of air, nitrogen, carbon dioxide and mixtures thereof, and mixtures of steam and a solvent selected from the group consisting of methane, ethane, propane, butane and mixtures thereof.

* * * * *